(12) United States Patent
Goldfinch et al.

(10) Patent No.: US 8,381,398 B2
(45) Date of Patent: Feb. 26, 2013

(54) COMPONENT WITH A DAMPING FILLER AND METHOD

(75) Inventors: Keith C. Goldfinch, Bristol (GB);
Oliver M. Strother, Nottingham (GB);
Julian Mackechnie-Jarvis, Sheffield (GB)

(73) Assignee: Rolls-Royce PLC, London (GB)

( * ) Notice: Subject to any disclaimer, the term of this patent is extended or adjusted under 35 U.S.C. 154(b) by 671 days.

(21) Appl. No.: 12/216,502

(22) Filed: Jul. 7, 2008

(65) Prior Publication Data

US 2009/0057489 A1    Mar. 5, 2009

(30) Foreign Application Priority Data

Jul. 13, 2007   (GB) .................................. 0713699.7

(51) Int. Cl.
*B21D 53/78*    (2006.01)
*B21D 31/04*    (2006.01)
*B21K 3/04*    (2006.01)

(52) U.S. Cl. .................. 29/889.7; 29/889.71; 29/889.72

(58) Field of Classification Search ...................... 29/6.1, 29/889.7, 889.71, 889.72; 228/157, 190, 228/265; 244/123.1, 123.11, 123.14
See application file for complete search history.

(56) References Cited

U.S. PATENT DOCUMENTS

| | | | |
|---|---|---|---|
| 2,202,014 A | 5/1940 | Lougheed | |
| 3,111,747 A | 11/1963 | Johnson | |
| 3,736,638 A | 6/1973 | Stone, Jr. | |
| 3,927,817 A * | 12/1975 | Hamilton et al. | 228/157 |
| 4,217,397 A | 8/1980 | Hayase et al. | |
| 4,292,375 A | 9/1981 | Ko | |
| 4,304,821 A | 12/1981 | Hayase et al. | |
| 4,331,284 A | 5/1982 | Schulz et al. | |
| 4,522,860 A | 6/1985 | Scott et al. | |
| 4,530,197 A | 7/1985 | Rainville | |
| 4,583,914 A | 4/1986 | Craig et al. | |
| 4,642,863 A | 2/1987 | Schulz | |
| 4,655,014 A | 4/1987 | Krecke | |
| 4,811,890 A | 3/1989 | Dowling et al. | |

(Continued)

FOREIGN PATENT DOCUMENTS

| | | |
|---|---|---|
| EP | 0 130 583 A2 | 1/1985 |
| EP | 0 181 203 A2 | 5/1986 |

(Continued)

OTHER PUBLICATIONS

Sep. 2, 2009 European Search Report issued in European Application No. 09 25 1341.

(Continued)

*Primary Examiner* — Alexander P Taousakis
(74) *Attorney, Agent, or Firm* — Oliff & Berridge, PLC

(57) ABSTRACT

A method of manufacturing an aerofoil for a gas turbine engine (10). The method comprises the steps of providing first and second panels (16, 18), providing a web (30) between the first and second panels, deforming the panels and the web by applying internal pressure between the panels so as to form a series of internal cavities partitioned by the web. The method further includes the step of either cutting the web (30) across its entire width or causing the web to fail across its entire width so as to define an aerofoil having first and second panels with at least one protrusion extending from the first panel partially across the space between the first and second panels.

2 Claims, 10 Drawing Sheets

U.S. PATENT DOCUMENTS

| | | | |
|---|---|---|---|
| 4,882,823 A * | 11/1989 | Weisert et al. | ............... 29/6.1 |
| 5,007,225 A | 4/1991 | Teasdale | |
| 5,143,276 A | 9/1992 | Mansbridge et al. | |
| 5,240,376 A | 8/1993 | Velicki | |
| 5,243,758 A | 9/1993 | Lemonds et al. | |
| 5,253,419 A | 10/1993 | Collot et al. | |
| 5,323,953 A | 6/1994 | Adderley et al. | |
| 5,330,092 A | 7/1994 | Gregg et al. | |
| 5,384,959 A | 1/1995 | Velicki | |
| 5,419,039 A | 5/1995 | Auxier et al. | |
| 5,469,618 A | 11/1995 | Lemonds et al. | |
| 5,534,354 A | 7/1996 | Gregg et al. | |
| 5,544,805 A | 8/1996 | Alassoeur et al. | |
| 5,570,552 A | 11/1996 | Nehring | |
| 5,692,881 A | 12/1997 | Leibfried | |
| 5,723,225 A | 3/1998 | Yasui et al. | |
| 5,821,506 A | 10/1998 | Matsen | |
| 5,826,332 A | 10/1998 | Bichon et al. | |
| 5,881,459 A | 3/1999 | Yasui | |
| 5,941,446 A | 8/1999 | Yasui | |
| 6,039,542 A | 3/2000 | Schilling et al. | |
| 6,139,278 A | 10/2000 | Mowbray et al. | |
| 6,224,341 B1 | 5/2001 | Fricke | |
| 6,331,217 B1 | 12/2001 | Burke et al. | |
| 6,419,146 B1 | 7/2002 | Buldhaupt et al. | |
| 6,467,168 B2 | 10/2002 | Wallis | |
| 6,669,447 B2 | 12/2003 | Norris et al. | |
| 6,720,087 B2 | 4/2004 | Fried et al. | |
| 6,893,211 B1 | 5/2005 | Eibl et al. | |
| 6,979,180 B2 | 12/2005 | Motherwell | |
| 7,025,568 B2 | 4/2006 | Jones | |
| 7,070,390 B2 | 7/2006 | Powell | |
| 7,144,222 B2 | 12/2006 | Lanni et al. | |
| 7,247,003 B2 | 7/2007 | Burke et al. | |
| 7,311,500 B2 | 12/2007 | Rongong et al. | |
| 7,431,197 B2 | 10/2008 | Franchet et al. | |
| 7,470,114 B2 | 12/2008 | Bonnet | |
| 7,753,654 B2 | 7/2010 | Read et al. | |
| 2002/0014101 A1 | 2/2002 | Yajima | |
| 2003/0136815 A1 | 7/2003 | Debaisieux et al. | |
| 2003/0156942 A1 | 8/2003 | Villhard | |
| 2003/0164255 A1 | 9/2003 | Borroni-Bird et al. | |
| 2004/0018091 A1 | 1/2004 | Rongong et al. | |
| 2004/0191069 A1 | 9/2004 | Motherwell | |
| 2006/0066133 A1 | 3/2006 | Ueno et al. | |
| 2006/0255098 A1 | 11/2006 | Runyan | |
| 2007/0065291 A1 | 3/2007 | Karafillis | |
| 2007/0243070 A1 | 10/2007 | Matheny | |
| 2007/0243408 A1 | 10/2007 | Straza | |
| 2009/0057488 A1 | 3/2009 | Goldfinch et al. | |
| 2009/0057491 A1 | 3/2009 | Goldfinch et al. | |
| 2009/0057718 A1 | 3/2009 | Suvorov et al. | |
| 2009/0060718 A1 | 3/2009 | Goldfinch et al. | |
| 2009/0304517 A1 | 12/2009 | Strother | |
| 2010/0021693 A1 | 1/2010 | Goldfinch et al. | |
| 2010/0186215 A1 | 7/2010 | Jones et al. | |

FOREIGN PATENT DOCUMENTS

| | | |
|---|---|---|
| EP | 0 209 867 A2 | 1/1987 |
| EP | 0 358 523 A1 | 3/1990 |
| EP | 0 418 179 A1 | 3/1991 |
| EP | 0 469 221 A1 | 2/1992 |
| EP | 0 354 631 B1 | 6/1992 |
| EP | 0 500 458 A1 | 8/1992 |
| EP | 0 520 827 A2 | 12/1992 |
| EP | 0 527 564 A1 | 2/1993 |
| EP | 0 549 172 A1 | 6/1993 |
| EP | 0 555 534 A2 | 8/1993 |
| EP | 0 582 795 A1 | 2/1994 |
| EP | 0 594 885 A1 | 5/1994 |
| EP | 0 765 711 A1 | 4/1997 |
| EP | 0 716 273 B1 | 3/1998 |
| EP | 0 926 312 A2 | 6/1999 |
| EP | 1 013 355 A2 | 6/2000 |
| EP | 1 085 288 A1 | 3/2001 |
| EP | 0 594 886 B1 | 7/2001 |
| EP | 1 160 752 A1 | 12/2001 |
| EP | 1 184 768 A2 | 3/2002 |
| EP | 1 024 330 B1 | 11/2002 |
| EP | 0 886 813 B1 | 1/2003 |
| EP | 1 327 489 A1 | 7/2003 |
| EP | 1 355 212 A1 | 10/2003 |
| EP | 1 433 993 A1 | 6/2004 |
| EP | 1 460 347 A1 | 9/2004 |
| EP | 1 460 507 A2 | 9/2004 |
| EP | 1 466 692 A1 | 10/2004 |
| EP | 1 491 980 A2 | 12/2004 |
| EP | 1 541 953 A1 | 6/2005 |
| EP | 1 561 901 A2 | 8/2005 |
| EP | 1 160 640 B1 | 2/2006 |
| EP | 1 653 165 A1 | 5/2006 |
| EP | 1 811 129 A2 | 7/2007 |
| EP | 2 014 384 A1 | 1/2009 |
| EP | 2 014 386 A1 | 1/2009 |
| EP | 2 014 387 A1 | 1/2009 |
| EP | 2 014 388 A1 | 1/2009 |
| EP | 2 014 869 A1 | 1/2009 |
| EP | 2 223 766 A1 | 9/2010 |
| GB | 842937 A | 7/1960 |
| GB | 1 367 958 A | 9/1974 |
| GB | 1 437 510 A | 5/1976 |
| GB | 2 124 520 A | 2/1984 |
| GB | 2 154 287 A | 9/1985 |
| GB | 1 284 867 A | 7/1987 |
| GB | 2 193 306 A | 2/1988 |
| GB | 2 198 264 A | 6/1988 |
| GB | 2 202 619 A | 9/1988 |
| GB | 2 206 685 A | 1/1989 |
| GB | 2 211 593 A | 7/1989 |
| GB | 2 228 069 A | 8/1990 |
| GB | 2 249 615 A | 5/1992 |
| GB | 2 251 063 A | 6/1992 |
| GB | 2 261 032 A | 5/1993 |
| GB | 2 298 265 A | 8/1996 |
| GB | 2 305 720 A | 4/1997 |
| GB | 2 360 070 A | 9/2001 |
| GB | 2 371 095 A | 7/2002 |
| GB | 2 387 669 A | 10/2003 |
| GB | 2 391 270 A | 2/2004 |
| GB | 2 393 498 A | 3/2004 |
| GB | 2 397 855 A | 8/2004 |
| GB | 2 401 407 A | 11/2004 |
| GB | 2 402 716 A | 12/2004 |
| GB | 2 408 295 A | 5/2005 |
| GB | 2 411 462 A | 8/2005 |
| GB | 2 416 228 A | 1/2006 |
| GB | 2 450 934 A | 1/2009 |
| GB | 2 450 935 A | 1/2009 |
| JP | A-2008-133825 | 6/2008 |
| WO | WO 97/27045 | 7/1997 |
| WO | WO 00/70271 A1 | 11/2000 |
| WO | WO 01/56332 A1 | 8/2001 |
| WO | WO 01/82018 A2 | 11/2001 |
| WO | WO 02/48615 A2 | 6/2002 |
| WO | WO 03/025469 A1 | 3/2003 |
| WO | WO 03/042607 A1 | 5/2003 |
| WO | WO 03/093916 A2 | 11/2003 |
| WO | WO 2004/102077 A1 | 11/2004 |
| WO | WO 2005/022953 A1 | 3/2005 |
| WO | WO 2005/045326 A1 | 5/2005 |
| WO | WO 2005/067619 A2 | 7/2005 |
| WO | WO 2005/069820 A2 | 8/2005 |
| WO | WO 2005/071510 A1 | 8/2005 |

OTHER PUBLICATIONS

Dec. 14, 2010 Search Report issued in British Application No. GB1020063.2.

Jul. 28, 2009 Search Report issued in British Patent Application No. 0907004.6.

Jul. 27, 2010 Search Report issued in European Patent Application No. EP 10 15 7495.2.

Jan. 19, 2010 Search Report issued in British Patent Application No. 0916687.7.

May 19, 2010 European Search Report issued in related European Patent Application No. 09252779.5 (with Abstract).

May 5, 2009 British Search Report issued in related British Patent Application No. GB0901235.2.
Mar. 18, 2009 British Search Report issued in British Patent Application No. GB0901318.6.
Dec. 7, 2010 Search Report issued in British Application No. GB1013305.6.
Sep. 2, 2010 Search Report issued in British Application No. GB1009216.1.
Sep. 15, 2009 Search Report issued in British Application No. GB0911416.6.
May 11, 2011 Partial European Search Report issued in European Application No. 10 16 5255.
Sep. 22, 2008 Search Report issued in British Application No. GB0808840.3.
Aug. 28, 2007 Search Report issued in British Application No. GB0713700.3.
Sep. 16, 2008 Search Report issued in British Application No. GB0813539.4.
Mar. 7, 2008 Search Report issued in British Application No. GB0713699.7.
Oct. 12, 2007 Search Report issued in British Application No. GB0713699.7.
Jul. 26, 2011 Office Action issued in U.S. Appl. No. 12/453,762.
Sep. 12, 2011 Office Action issued in U.S. Appl. No. 12/453,762.
Dec. 21, 2011 Notice of Allowance issued in U.S. Appl. No. 12/453,762.
Dec. 27, 2011 Notice of Allowance issued in U.S. Appl. No. 12/216,503.
Sep. 26, 2011 Office Action issued in U.S. Appl. No. 12/453,435.
Feb. 25, 2011 Office Action issued in U.S. Appl. No. 12/216,505.
Jun. 2, 2011 Office Action issued in U.S. Appl. No. 12/216,505.
Nov. 23, 2011 Office Action issued in U.S. Appl. No. 12/216,505.
U.S. Appl. No. 13/299,671 in the name of Strother, filed Nov. 18, 2011.
U.S. Appl. No. 12/654,504 in the name of Jones et al., filed Dec. 22, 2009.
U.S. Appl. No. 12/645,211 in the name of Strother, filed Dec. 14, 2009.
U.S. Appl. No. 12/844,215 in the name of Harron, filed Jul. 27, 2010.
U.S. Appl. No. 12/730,641 in the name of Strother, filed Mar. 24, 2010.
U.S. Appl. No. 13/186,850 in the name of Goldfinch et al, filed Jul. 20, 2011.
U.S. Appl. No. 13/114,382 in the name of Strother, filed May 24, 2010.
U.S. Appl. No. 12/453,762 in the name of Goldfinch, filed May 21, 2009.
U.S. Appl. No. 12/216,505 in the name of Strother, filed Jul. 7, 2008.
U.S. Appl. No. 12/453,435 in the name of Strother, filed May 11, 2009.
U.S. Appl. No. 12/796,231 in the name of Mason, filed Jun. 8, 2010.
U.S. Appl. No. 13/008,323 in the name of Strother, filed Jan. 18, 2011.
U.S. Appl. No. 12/720,253 in the name of Strother, filed Mar. 9, 2010.
U.S. Appl. No. 12/720,351 in the name of Strother, filed Mar. 9, 2010.
Jul. 20, 2011 Office Action issued in U.S. Appl. No. 12/216,497.
Jul. 1, 2011 Office Action issued in U.S. Appl. No. 12/216,503.
Oct. 7, 2008 European Search Report issued in European Patent Application No. 08 01 1077.
Oct. 20, 2008 European Search Report issued in European Patent Application No. 08 01 1078.
Oct. 21, 2008 European Search Report issued in European Patent Application No. 08 01 1079.
Office Action mailed Feb. 3, 2011 in U.S. Appl. No. 12/216,497.
U.S. Appl. No. 12/216,503 filed Jul. 7, 2008.
U.S. Appl. No. 12/216,497 filed Jul. 7, 2008.
Mar. 7, 2012 Final Office Action issued in U.S. Appl. No. 12/453,435.
Mar. 20, 2012 Office Action issued in U.S. Appl. No. 12/216,505.
Jun. 29, 2012 Office Action cited in U.S. Appl. No. 12/654,504.

* cited by examiner

COMPONENT WITH A DAMPING FILLER AND METHOD

The present invention relates to a component with a damping material as a filler. The invention is particularly, although not exclusively, useful for aerofoils, such as fan blades for a gas turbine engine.

It is known to use hollow aerofoils on gas turbine engines fan blades. The hollow aerofoil is typically formed by inflating a blade pre-cursor at superplastic temperatures and is often provided with an internal metallic structure to increase strength and prevent so called panting of the walls of the aerofoil, ie movement towards and away from each other. To facilitate damping and reduce vibration of the component, the hollow cavity can be filled with a damping material, for example a visco-elastic material. Generally in such filled components, the cavity is smooth walled with no internal structure.

It is an object of the invention to provide an improved component.

According to one aspect of the invention there is provided an aerofoil for a gas turbine engine comprising first and second panels spaced apart from each other, the first panel having at least one protrusion extending therefrom towards the second panel, characterised in that the protrusion extends partially across the space between the first and second panels so as to define a free end of the protrusion and in that the free end is surrounded by visco elastic a damping material, and the second panel comprises at least one protrusion extending therefrom towards the first panel partially across the space therebetween.

In that way, an internal strengthening structure can be provided and the damping material is rendered more effective than if it was merely damping in shear.

Preferably the space between the panels is substantially filled by the damping material.

A plurality of protrusions may extend from the first panel. In that case, the respective free ends of the protrusions are respectively surrounded by the damping material and most preferably connected together by means of the damping material.

The second panel comprises at least one protrusion extending therefrom towards the first panel. The protrusion extending from the second panel has a free end surrounded by damping material. Most preferably, the free end of the protrusion extending from the second panel and the free end of the protrusion extending from the first panel are connected together by means of the damping material.

Where respective protrusions extend from the first and second panels, the protrusions may be co-linear when viewed in section. Alternatively, the protrusions may be offset from each other. Where respective pluralities of protrusions extend from the first and second panels, the protrusions extending from the first panel preferably interdentate with the protrusions extending from the second panel.

Each protrusion may extend for more than half of the distance across the space between the first and second panels. Alternatively each protrusion may extend for less than half of the distance across the space between the first and second panels.

The free end of the protrusion may have a cross part extending transverse to the rest of the protrusion. The free end may comprise an enlarged head. The free end may comprise a plurality of fins. The free end may comprise a "U" shaped portion.

The or each protrusion may comprise an elongate rib or vane. The rib may include a bend along the length thereof.

Where a plurality of protrusions are provided, the protrusions may each comprise an elongate rib and, preferably, at least some of the ribs are not parallel with respect to each other.

The rib may define a cylinder. Where a plurality of cylinders are defined by the ribs, the cylinders may be arranged to nest one within the other and most preferably the cylinders are arranged concentrically.

The aerofoil is preferably a fan blade. Most preferably, the fan blade is formed super-plastically and the protrusion comprises a warren girder structure which is split apart, part of the way between the first and second panels of the fan.

According to another aspect of the invention there is provided a method of manufacturing an aerofoil for a gas turbine engine, the method comprising the steps of providing a first panel having at least one protrusion extending therefrom, providing a second panel, securing the first and second panels together so as to define a space therebetween and so that the protrusion extends partially across the space between the first and second panels, and injecting a damping material into the space between the panels so as to surround the free end of the protrusion.

According to a further aspect of the invention there is provided a method of manufacturing a component comprising steps of providing first and second panels, providing a web between the first and second panels, deforming the panels and the web by applying internal pressure between the panels so as to form a series of internal cavities partitioned by the web, the method being characterised by the steps of either cutting the web across its entire width or causing the web to fail across its entire width so as to define a component having first and second panels with at least one protrusion extending from the first panel partially across the space between the first and second panels.

It should be noted that this differs from the method in our co-pending application entitled 'Component with Internal Damping' due to the fact that the web fails across its entire width or is cut across its entire width, whereas the web in the "Component with Internal Damping" case has apertures formed therethrough.

The method of manufacture preferably comprises the steps of providing a plurality of webs, locally weakening the webs across their entire width at a position on the webs spaced from the ends thereof, disposing the plurality of webs between two panels, causing the webs to be joined to the panels, deforming the panels and the webs in two stages, the first stage comprising the steps of heating the panels and the webs to a superplastic temperature range and applying an internal pressure between the panels so that the panels are pushed apart to contact a die in a first die position, the second stage comprising the steps of maintaining the panels and the webs at a hot forming temperature range, below the superplastic temperature range and applying an internal pressure between the panels so that the panels are pushed apart to contact a die in a second die position, whereby the locally weakened parts of the webs fail across the entire width thereof.

Figure 14:
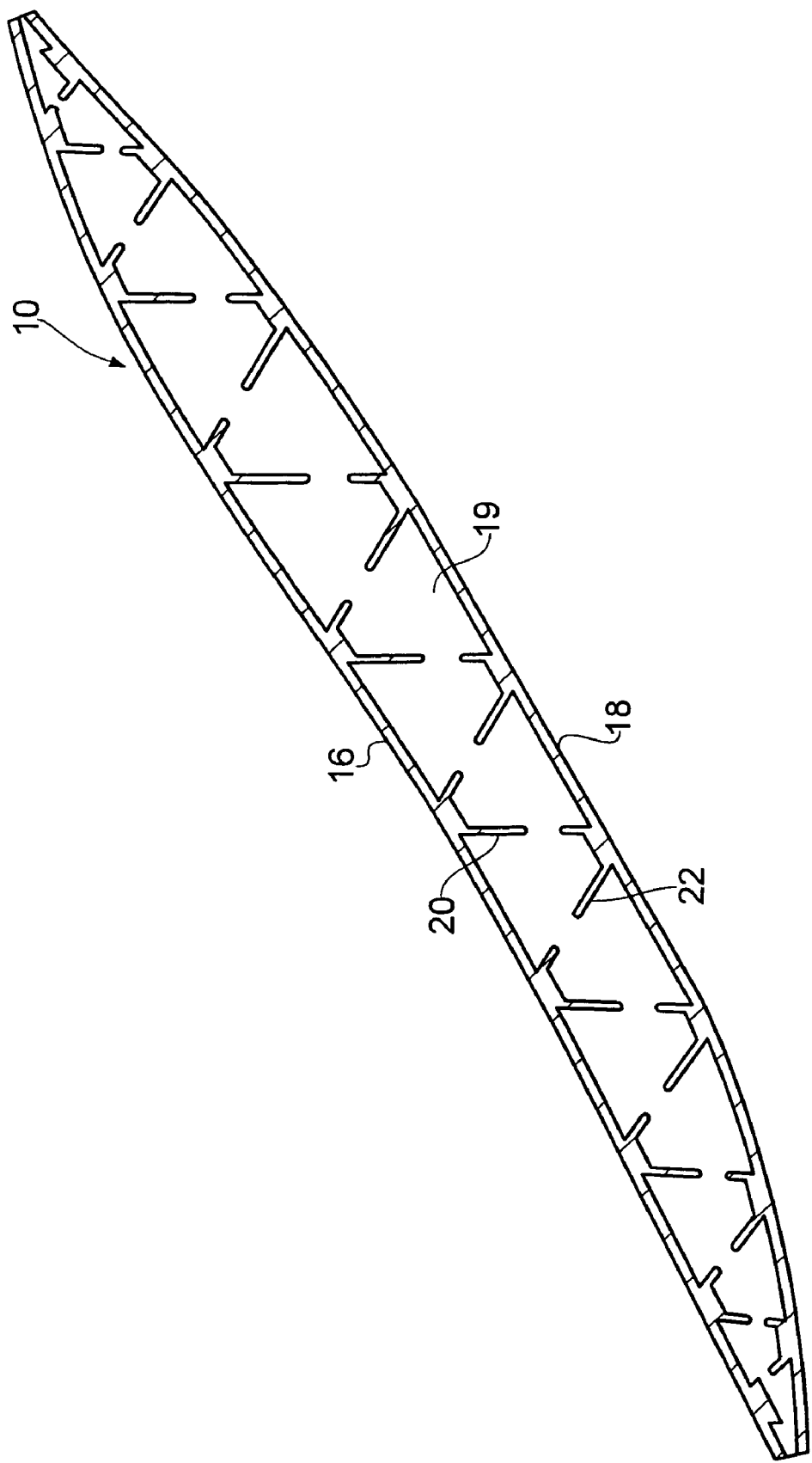
FIG. 14 is a cross-section through an alternative fan blade in accordance with the first aspect of the invention and made according to the method of the third aspect of the invention.
Figure 16:
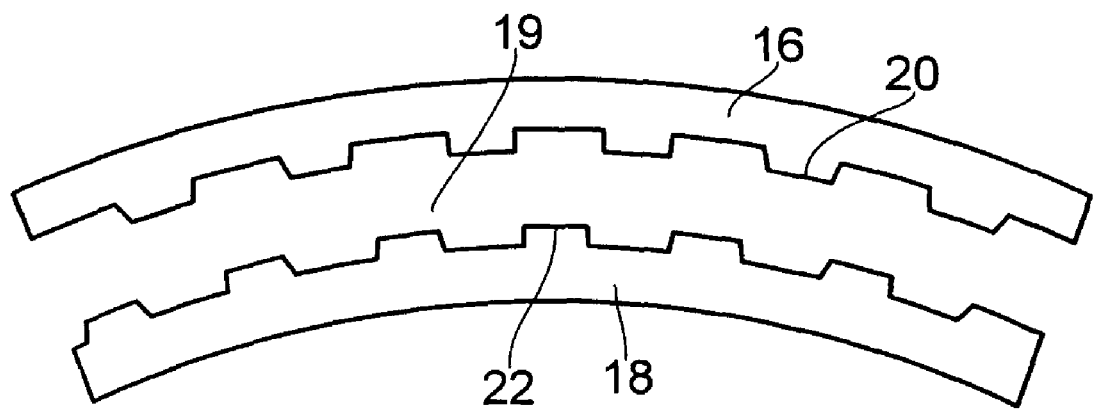
Figure 17:
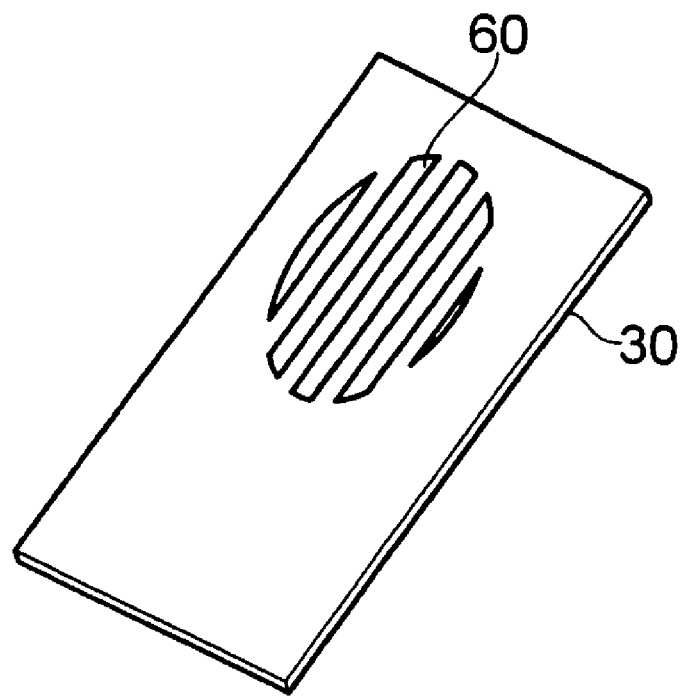
Figure 18:
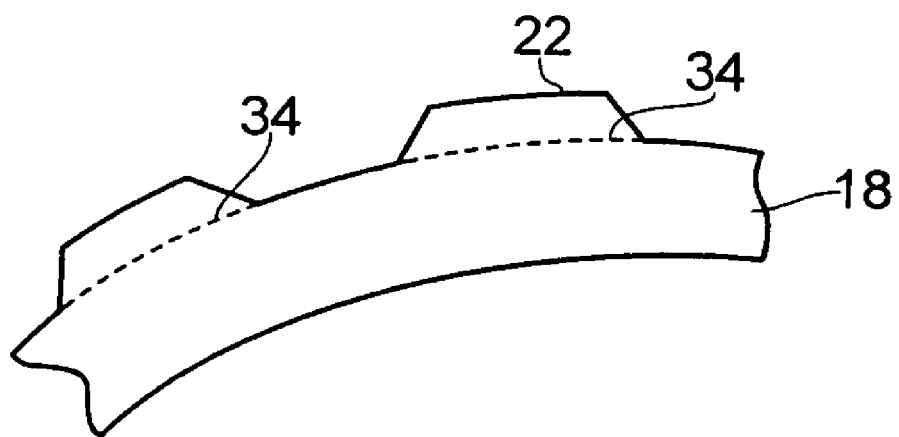

FIGS. 15a to d show stages in the method of manufacturing the fan blade shown in FIG. 14 in accordance with the third aspect of the invention;

FIG. 16 is a cross-sectional view of part of a fan blade in accordance with the invention;

FIG. 17 shows a web membrane for use in the manufacture of the fan of FIGS. 16, 18 and 19;

FIG. 18 is a cross-sectional view of part of the fan of FIGS. 16 and 17; and

Figure 19A:
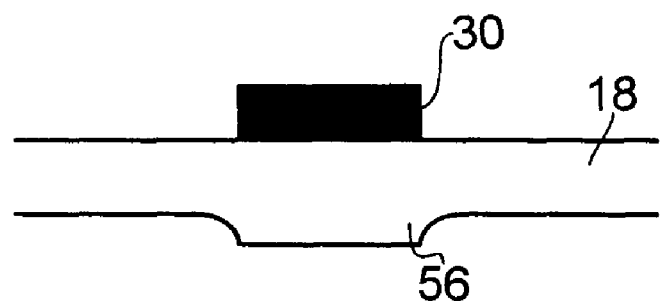
Figure 19B:
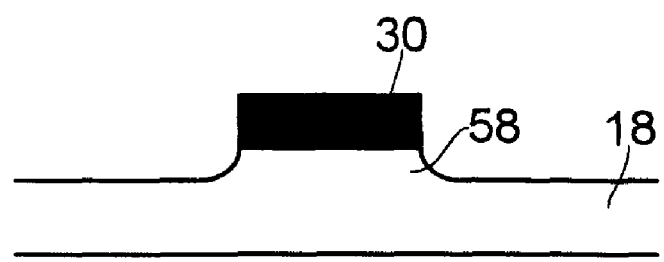

FIGS. 19a and b are cross-sections through part of the fan of FIG. 16 showing two stages in the manufacturing procedure.

Figure 1:
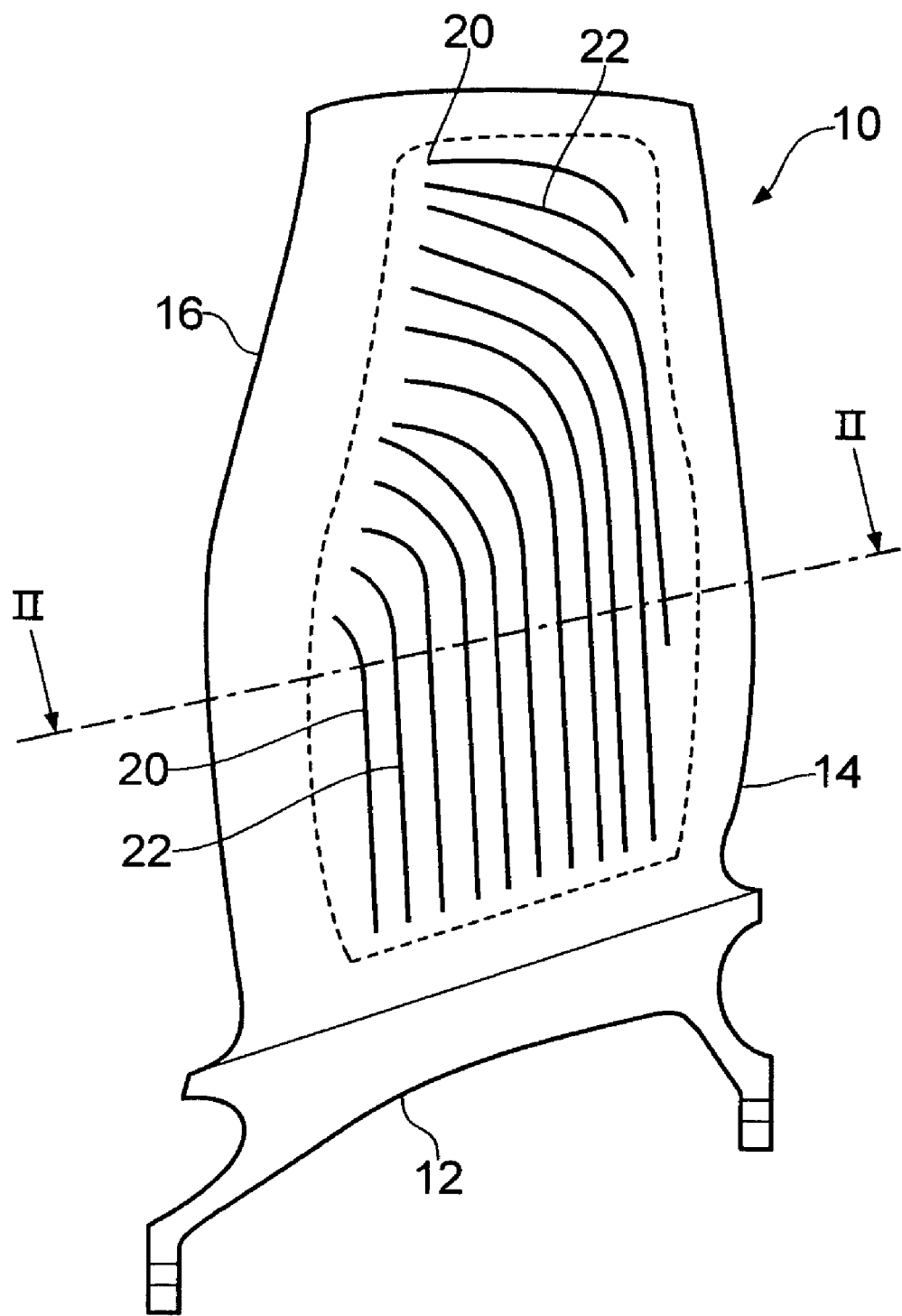
FIG. 1 is a perspective view of a blisk comprising a disk and blade body for a gas turbine in accordance with the first aspect of the invention.
Figure 2:
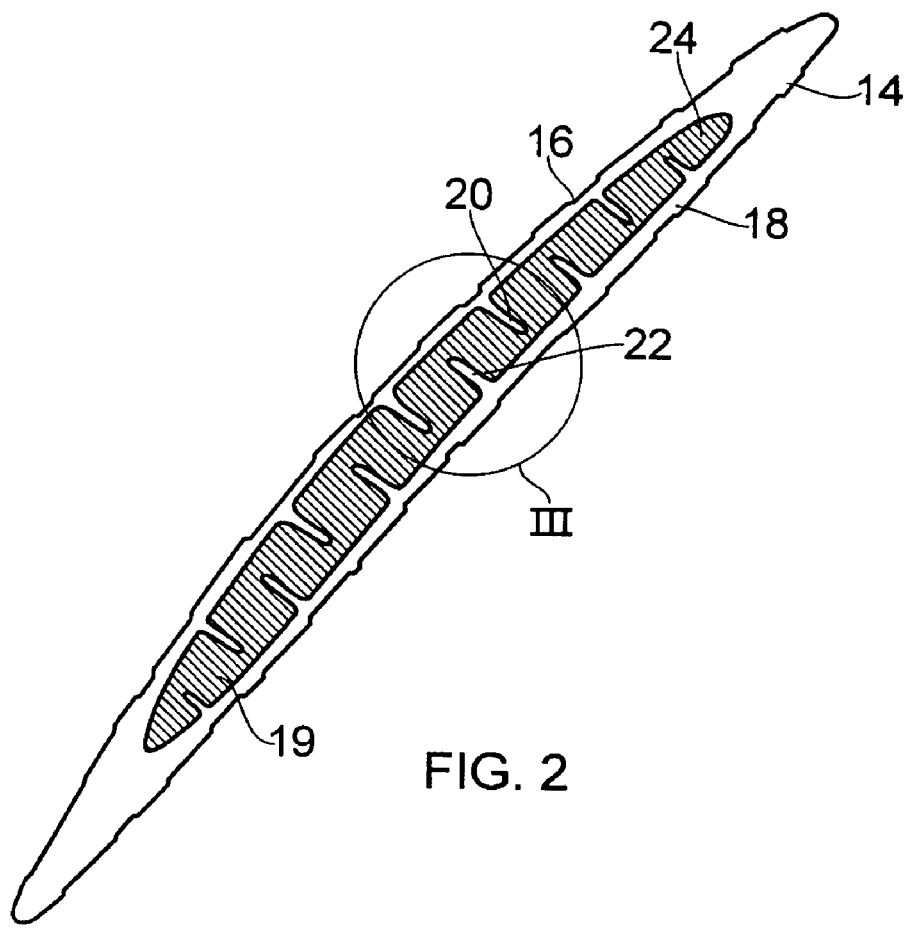
FIG. 2 is a cross-section through the blade of FIG. 1 taken on line II-II in FIG. 1.
Figure 3:
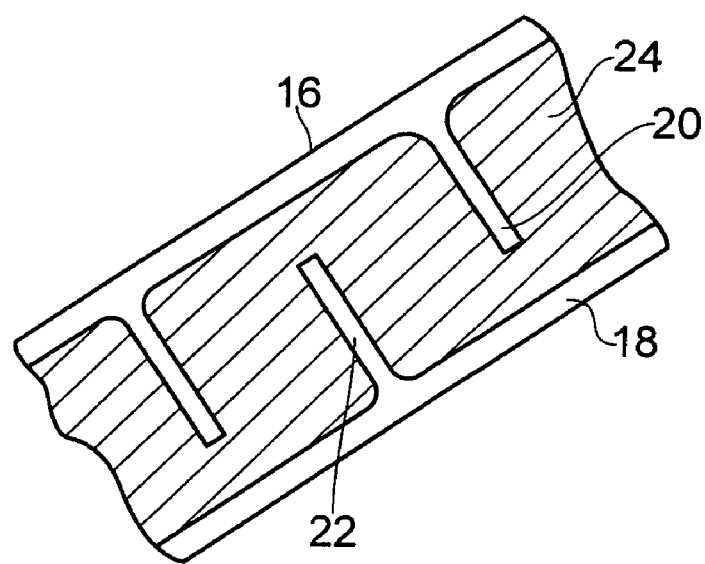
FIG. 3 is an enlarged sectional view of part of the blade of FIGS. 1 and 2.

In FIG. 1, a blisk 10 comprises a disk 12 and fan blade body 14. The blade body 14, as best shown in FIGS. 2 and 3, comprises first and second panels 16, 18 which are spaced apart to define a void (or cavity) 19 therebetween. Each of the first and second panels 16, 18 has a series of elongate ribs 20, 22 respectively extending therefrom into the void 19. As shown in FIGS. 2 and 3, the ribs 20, 22 extending from the opposing panels are arranged to interdentate.

The void 19 is filled with a visco-elastic damping material 24. By way of non limiting example, the damping material 24 may be a Huntsman™ syntactic damping paste or some such similar product. The damping material 24 surrounds the ends of the ribs 20, 22 and adheres to the ribs and the inner surfaces of the panels. The damping material is of known composition and acts to inhibit vibration. Because the ribs 20, 22 do not extend across the full width of the void 19 and because they are surrounded by the visco-elastic material 24 they impart more strain into the visco-elastic material 24 rather than transmitting load from one panel 16 to the other 18.

FIG. 1 shows the longitudinal extent of the ribs 20, 22. It can be seen from that figure that a preferred configuration of the ribs 20, 22 is for the ribs near the blade tip to extend substantially parallel with the blade tip. At the tip, the steady stresses on the panel are less and the parallel configuration maximises strength of the tip against impact, eg bird strike. The parallel configuration also acts as a dam to prevent the visco-elastic material 24 from overloading and/or escaping the tip. Towards the disk 12, the ribs 20, 22 extend generally parallel with the longitudinal of the blade body 14 so as to enhance the steady strength of the blade 10. Some of the ribs 20, 22 have a bend or curve along their length. Other rib configurations are envisaged and could be designed to maximise damping from specific mode shapes.

FIGS. 4 to 13 show various rib formations with a variety of configurations of visco-elastic material 24.

Figure 4:
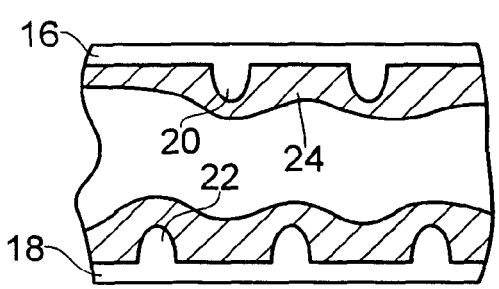
FIGS. 4 to 13 are sectional views of various rib formations for use in the blade of FIGS. 1 and 2.

In FIG. 4, the ribs 20, 22 only protrude around a quarter of the way across the void 19 between the panels. The visco-elastic material 24 in the FIG. 4 embodiment lies along the inner surface of the panels 16, 18 over the ribs 20, 22 with a space between opposite panels 16, 18. Here the primary damping function is shearing of the visco-elastic material 24 which is enhanced by the mechanical keying of the ribs 20, 22 into the material 24.

Figure 5:
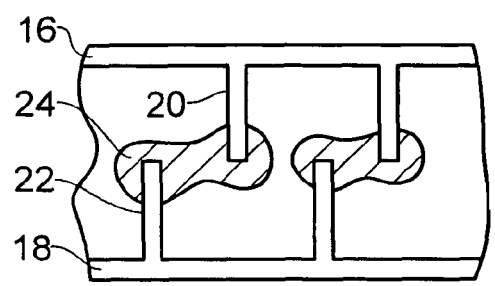

In FIG. 5, the ribs 20, 22 each extend approximately half way across the void 19 and are spaced apart laterally. The visco-elastic material 24 connects the free ends of the alternate opposite ribs 20, 22. In this way, loading to one panel 16 is transmitted to the other panel 18 via the ribs 20, 22, passing through the visco-elastic material 24.

Figure 6:
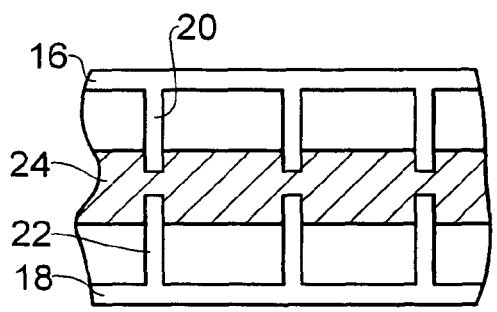

In FIG. 6, the ribs 20, 22 each extend approximately 40% of the way across the void 19. The ribs 20, 22 are co-linear which leaves a space 26 therebetween. The visco-elastic material 24 surrounds the ends of all of the ribs 20, 22 and connects them all together. Thus load applied to one rib 20 is passed by the visco-elastic material and spread to all other ribs 20, 22, simultaneously damping that load.

Figure 7:
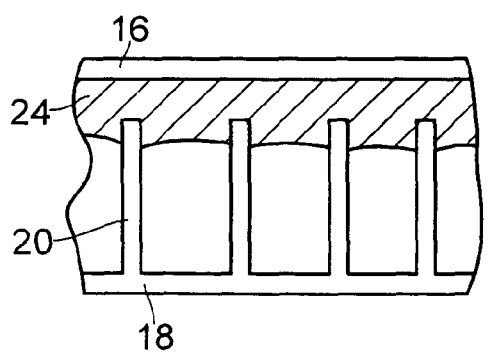

In FIG. 7, ribs 20 extend from one panel 16 only and extend about 80% of the distance across the void 19. The visco-elastic material 24 coats the other panel 18 and surrounds the free ends of the ribs 20.

Figure 8:
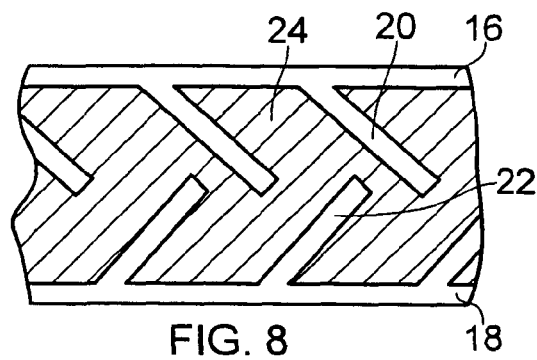

In FIG. 8, the ribs 20, 22 extend obliquely from the panels 16, 18 for example at a 60° angle, although other angles are possible. The ribs 20, 22 interdentate and the visco-elastic material fills the void 19. The ribs 20, 22 may be inclined at the same or different angle to one another. The angle of inclination may change along the length of the rib to optimise the damping efficiency and load distribution.

Figure 9:
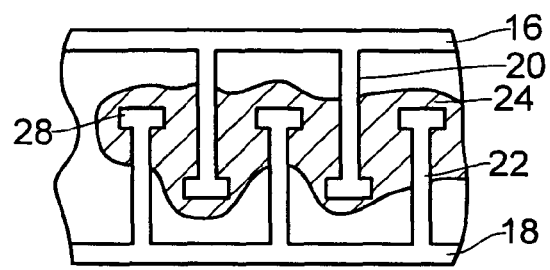

In FIG. 9, the ribs 20, 22 interdentate, extending around three quarters of the way across the void 19. Each rib 20, 22 has a head formation 28 formed by a cross member at the free end thereof. The visco-elastic material is configured similar to that in FIG. 6. The head formations 28 increase the surface area of the free ends to promote rib-visco-elastic material interaction.

In the embodiments described with reference to FIGS. 4 to 7 and 9 the visco-elastic material only partially fills the cavity/void 19 formed between panels 16 and 18. However, the cavity 19 may also be substantially completely filled with visco-elastic material.

Figure 10:
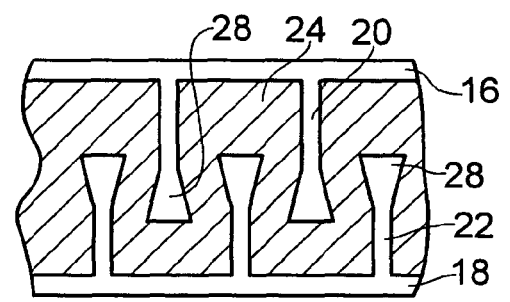
Figure 11A:
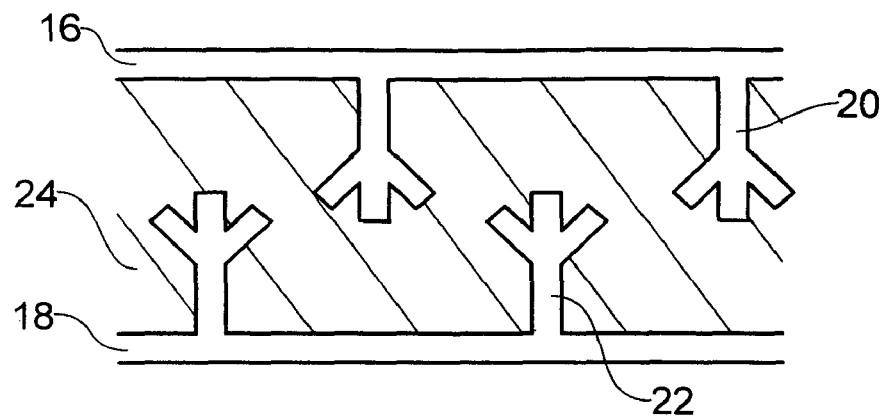
Figure 11B:
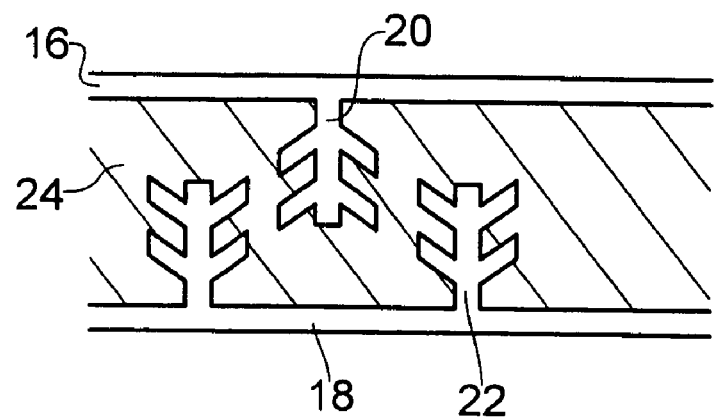
Figure 11C:
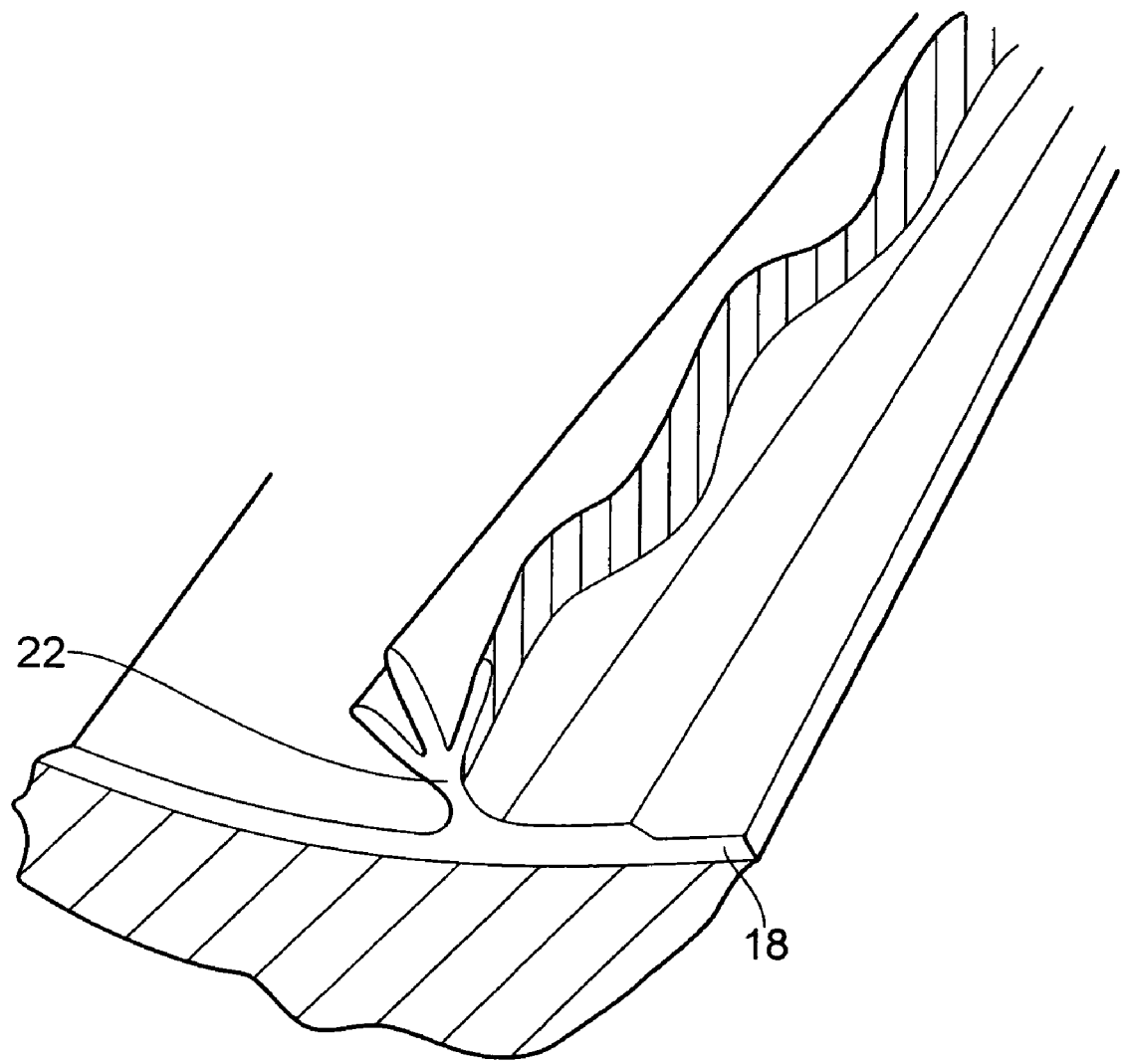

In FIG. 10, the ribs 20, 22 are similar to those in FIG. 9 with an enlarged head 28 rather than a cross piece. The visco-elastic material fills the void 19. Alternatively, or additionally, the ribs 20,22 may terminate in a plurality of fingers or fins which fan out from the free end, as shown in FIG. 11a. In a similar fashion, the fingers or fins may branch off from the ribs 20,22 along their span, as shown in FIG. 11b. Alternatively, and as shown in FIG. 11c the fingers/fins may additionally be provided with a waved profile. That is to say, the fingers/fins vary in distance from the panels 16,18 in a sinusoidal like pattern along the height of the panel. Such an arrangement stiffens the ribs 20,22 and alters its vibration characteristic.

Figure 12:
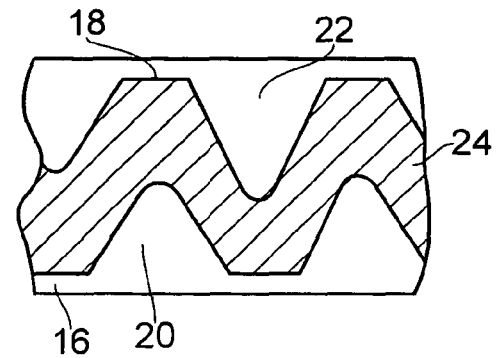

In FIG. 12, the ribs 20, 22 have an interdentating saw-tooth configuration.

Figure 13:
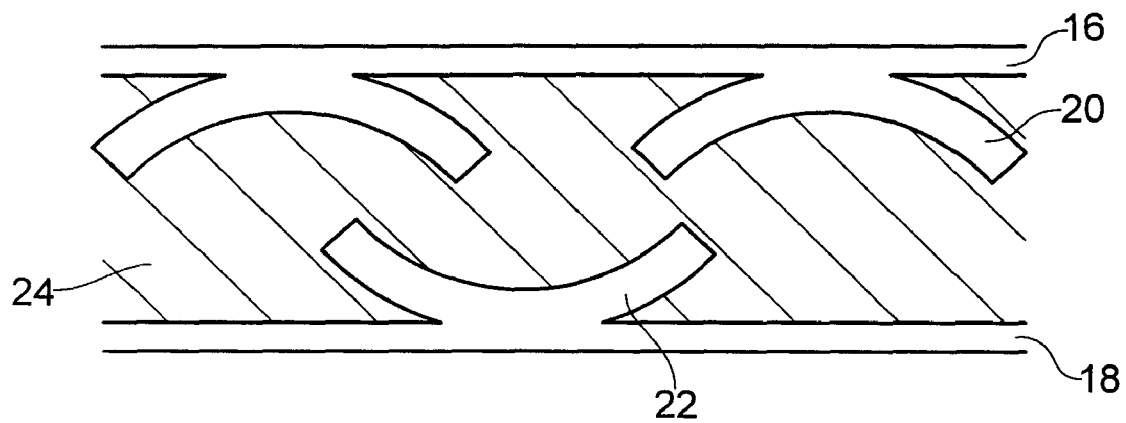

In FIG. 13, the ribs 20,22 have a "U" shaped cross-section.

It is envisaged that all of the embodiments described above could be made by machining one or both panels to include the ribs and securing the panels together in known fashion, then injecting the visco-elastic material. Alternatively, the visco-elastic material can be arranged on one or both of the panels prior to securing the panels together.

Although in the embodiment of FIG. 1 the ribs are shown substantially across the whole of the panel 16, 18, the ribs may be restricted to significant areas, for example where high strain levels are likely to be experienced. Also, the ribs are shown to include a curve or bend and they could be straight. The ribs could be arranged parallel with each other.

An alternative blade is shown in section in FIG. 14. The blade is similar to that shown in FIG. 1 and parts corresponding to parts in FIGS. 1-3 carry the same reference numerals.

In FIG. 14, the blade 10 is made from first and second panels 16, 18. Each panel 16, 18 has a respective series of ribs 20, 22 extending therefrom. The ribs 20, 22 comprise a split warren girder structure.

FIGS. 15a-d illustrate the manufacturing process for making the blade 10 in FIG. 14.

The first stage in the manufacturing procedure is to arrange the panels 16, 18 together sandwiching a web membrane 30 therebetween. The web membrane 30 will become the projections 20, 22 at the end of the process. The inner surfaces of the panels 16, 18 are locally treated with a release agent. For panels manufactured from titanium, the release agent may be Yttria. The release agent is indicated by the cross-hatched portion 32 on the panel 18 in FIG. 15a.

The package of first and second panels and web membrane is heated and compressed to the extent that the membrane 30 begins to become attached to the inner surfaces of the panels 16, 18 except in the area coated by Yttria 32. The attachment of the membrane 30 to the panel 16, 18 is effected by diffusion bonding of the material. It should be noted that the panels and the web membrane are generally all formed of the same material which is suitable for such diffusion bonding and super plastic formation, such as titanium.

After the initial process is complete, the web membrane 30 is connected to the first panel 16 at a first point by means of a diffusion bond 34 and to the second panel 18 at a second point spaced from the first point, again a diffusion bond 34. The membrane is typically 1-2 mm thick.

The web membrane 30 is pre-scored either with a continuous scored line or with a series of perforations through the material thereof. The score line 36 extends across the full width of the rib-to-be at a point between sections of the web membrane 30 which have bonded to the first and second panels 16-18.

Figure 15A:
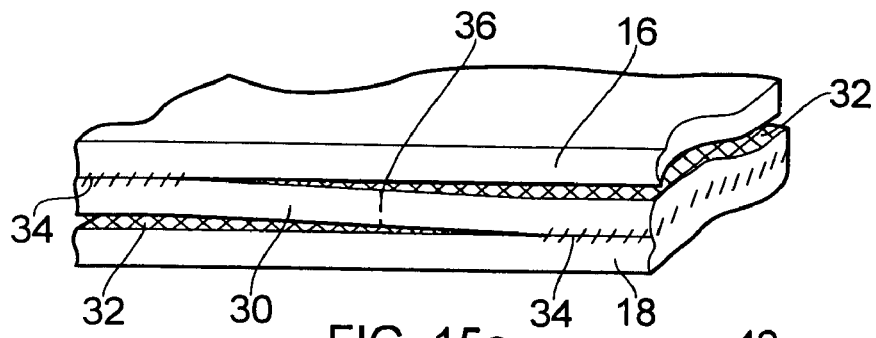
Figure 15B:
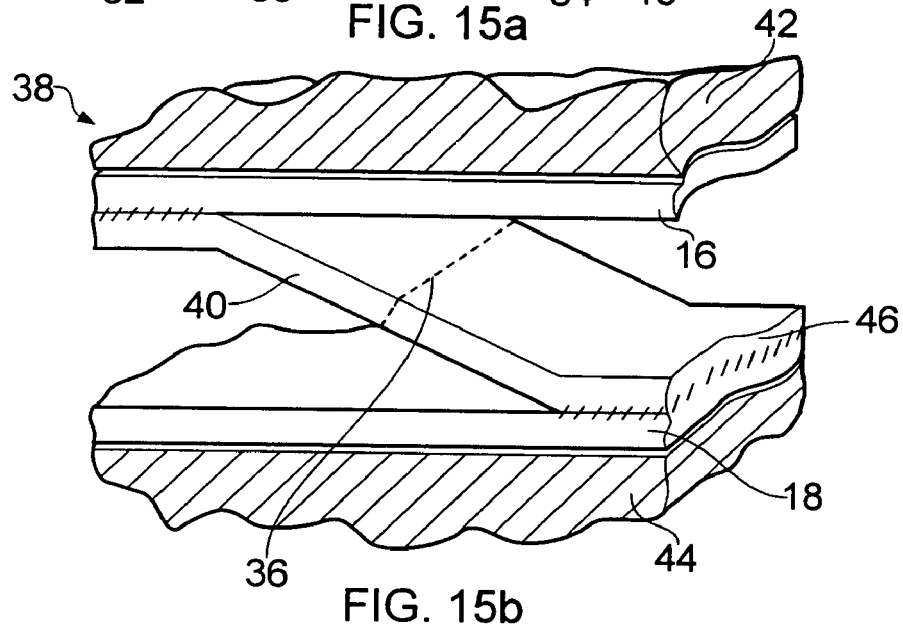
Figure 15C:
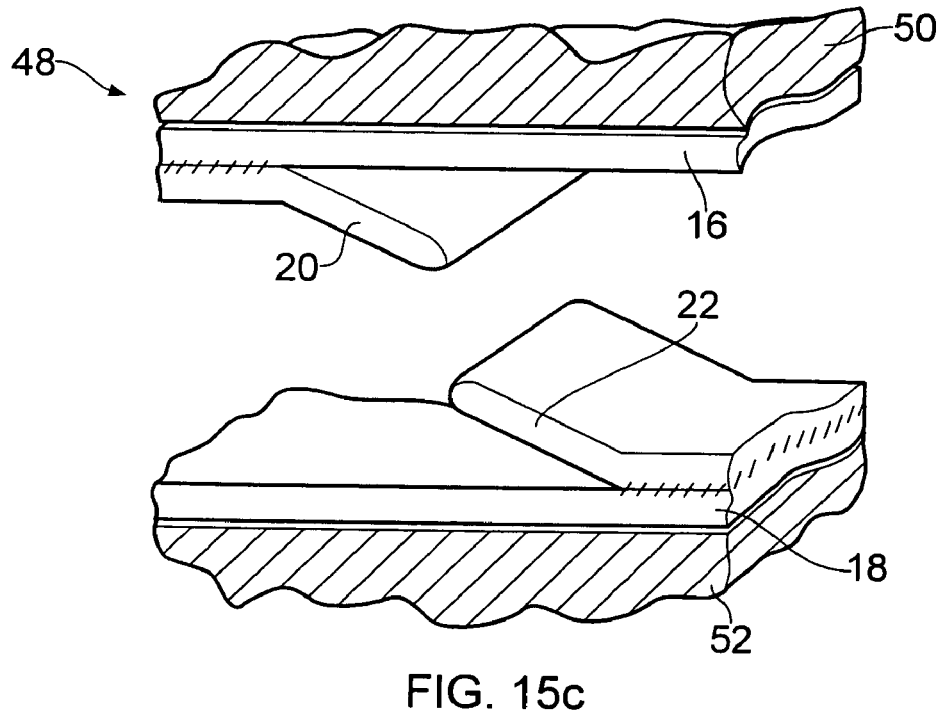

The resulting sandwich construction from FIG. 15a is then arranged in a first die 38 (see FIG. 15b). The sandwich construction is then subjected to a conventional super plastic forming operation. The die 38 and the sandwich construction is subjected to heating to a super plastic temperature for the material in question. Generally that is titanium and so the material is heated to approximately 850° Celsius, although other materials may be used. Then an inert gas is injected at high pressure into the interior of the sandwich construction between the panels 16, 18. At the elevated temperature the high pressure gas pushes the panels 16, 18 apart stretching the section of the membrane 40 that is not bonded to either of the panels 16, 18 so as to form a web 40. The sandwich construction is allowed to continue to extend by moving apart of the panels 16, 18 until the panel 16, 18 contacts the surface of the opposing die plates 42, 44 of the die 38.

That results in the blade subassembly 46 shown in FIG. 15b. The blade subassembly is then allowed to cool and is arranged in a second die 48. The second die 48 has opposing surfaces on die plates 50, 52 which are formed as a female die formation for the ultimate shape of the panels 16, 18. The surfaces of die plates 50, 52 are spaced further apart than the surfaces of die plates 42, 44.

The subassembly 46 is then subject to a hot forming process in which, again, the die 48 and the subassembly 46 is heated to a hot forming temperature, for titanium normally around 750° Celsius. The inert gas is then re-injected into the interior of the subassembly 46 at high pressure (30 bar). This causes the panels 16, 18 to be deformed and move away from each other against the surfaces of the die plates 50, 52. However, because the titanium is not at a superplastic temperature and because of the inherent weakness introduced by the score line 36, the web 40 fails across its entire width along the score line 36 so as to form the first and second ribs 20, 22 extending from the first and second panels respectively.

Figure 15D:
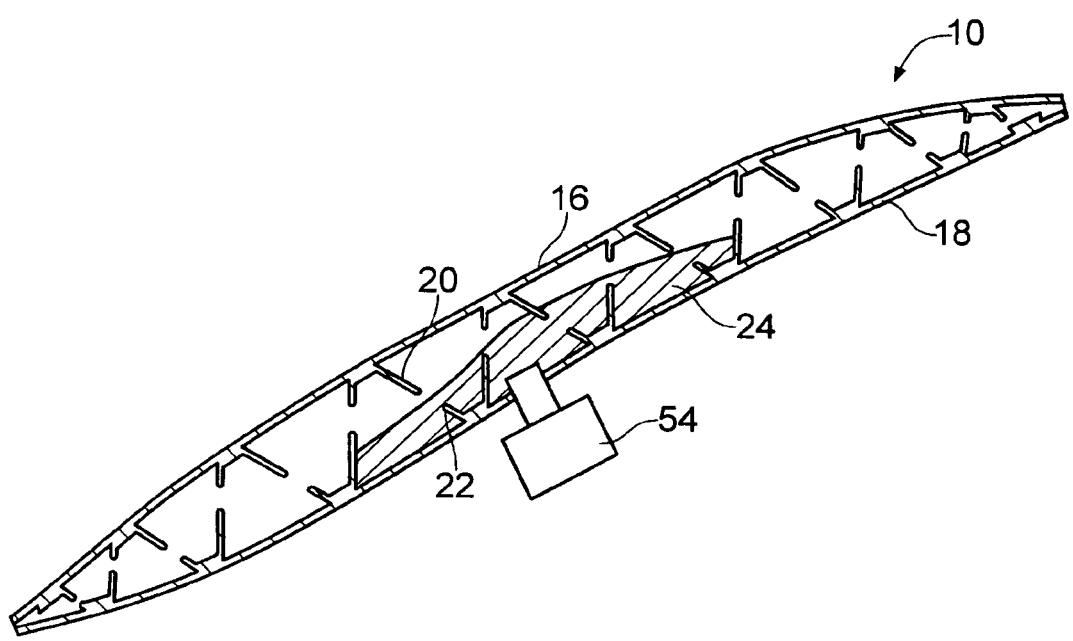

The internal pressure is applied until the panels 16, 18 have assumed their final shapes. The fan blade 10 is then removed from the die and cooled. Subsequently, the internal cavity is chemically cleaned and a visco-elastic material 24 is injected into the blade 10 by means of an injector 54, as shown in FIG. 15d. That results in a fan blade 10 as shown in FIG. 14 filled with visco-elastic material and having a split warren girder structure so as to define ribs 20, 22 extending from opposite panels 16, 18 into the void 19 therebetween.

FIG. 16 is a sectional view through a component, such as a fan blade 10. Parts corresponding to parts in FIGS. 1-14 carry the same reference numerals.

The blade 10 comprises first and second panels 16, 18 spaced apart from each other with short ribs 20, 22 extending, respectively, from the panels 16, 18 into a void 19 defined between the panel 16. A visco-elastic material (not shown) can be injected into the void 19 between the panels. The short ribs 20, 22 act as a mechanical key to increase the effective damping capability of the visco-elastic material whereby the material does not rely on a bond or frictional interaction between the panel 16, 18 and itself but rather a mechanical interaction.

The shorter projections 20, 22 are formed in a similar fashion to the mechanism described in FIGS. 15a and 15b above except the regions treated with the release material are arranged so that no connecting web between the panels 16, 18 is formed in the superplastic formation process. Instead, the membrane is diffusion bonded to the panels to form the protrusions.

In FIG. 17, a web membrane 30 is shown. The web membrane is generally made from the same material as the first and second panels, often titanium is used. The membrane 30 is 1 mm-2 mm in thickness and it can be seen that in the FIG. 18 arrangement parts of the membrane 30 have been cutaway to produce a rib pattern 60. It is envisaged that a variety of rib patterns could be providing by cutting the web membrane 30 into desired patterns. Additionally, the surface of the membrane 30 could be coated in selected regions with a release substance, such a Yttria.

As with the arrangement shown in FIG. 15a, the membrane 30 is bonded to the panels 16,18 in selected regions. However, since the membrane 30 has alternate ribs 60 which are attached to the panel 16 and panel 18, there is no material with which to form the a web 40, and hence the ribs 20,22 are formed from the material of the membrane 30 bonded to the panels 16,18. This is presented in FIG. 18, where ribs 22 are shown with a diffusion bond 34 connecting them to the panel 18.

In an alternative embodiment, and as shown in FIGS. 19a and b, a machined protuberance is provided on the eventual outer surface of one of the panels 16, 18. The protuberance 56 can be arranged at a point coincident with part of the web membrane arranged on the opposite face or could be arranged at a different point. During the superplastic forming process, the protuberance 56 is pushed against the surface of the die plate. This causes the protuberance to be flattened against the die plate and the material from the protuberance is forced in to create an inwardly extending protuberance 58 (see FIG. 19b). If the outwardly extending protuberance 56 is arranged coincident with the membrane 30, the resulting rib will comprise the membrane 30 and the inwardly extending protuberance 58.

The internal ribs can be devised of any shape tolerated by a diffusion bonding process or can be manufactured by machining the internal skin of the blade panel.

The ribs could be made of pure metallic alloy or a composite. The join between the internal wall of the panel and the internal ribs preferably has a leading chamfer to reduce local stresses in the area of the diffusion bond. As previously, the section of the blade covered in ribs can be localised or across the surface of the panels.

The ribs formed by the above process provide a mechanical key for better interaction between the blade panels 16, 18 and a visco-elastic damping material injected into the void 19 between the panels 16, 18. The ribs help prevent delamination of the damping media from the inner surface and increase the surface area for the material to bond to.

The size, shape and position of the ribs can be selected to influence any problematic vibration so as to move them outside of the normal running range of, for instance, the fan or blisk.

Although we have described the application of the above invention to a fan blade, it is envisaged that any suitable hollow structure could use the present invention.

The invention claimed is:

1. A method of manufacturing an aerofoil with first and second panels and a web between the first and second panels for a gas turbine engine, comprising:
   deforming the panels and the web by applying internal pressure between the panels so as to form a series of internal cavities partitioned by the web, and
   either cutting the web across its entire width or causing the web to fail across its entire width so as to define an aerofoil having first and second panels with at least one protrusion extending from the first panel partially across the space between the first and second panels.

2. The method of claim 1, wherein the web includes a plurality of webs, further comprising:
   locally weakening the webs across their entire width at a position in the webs spaced from the ends thereof,
   disposing the plurality of webs between two panels,
   causing the webs to be joined to the panels,
   deforming the panels and the webs in two stages,
      the first stage including heating the panels and the webs to a superplastic temperature range and applying an internal pressure between the panels so that the panels are pushed apart to contact a die in a first die position,
      the second stage including maintaining the panels and the webs at a hot forming temperature range, below the superplastic temperature range, and
   applying an internal pressure between the panels so that the panels are pushed apart to contact a die in a second die position, whereby the locally weakened parts of the webs fail across the entire width thereof.

* * * * *